US008002175B2

(12) United States Patent
Kuriyama et al.

(10) Patent No.: US 8,002,175 B2
(45) Date of Patent: Aug. 23, 2011

(54) SYSTEM AND METHOD FOR UTILIZING A HIGHLY SECURE TWO-DIMENSIONAL MATRIX CODE ON A MOBILE COMMUNICATIONS DISPLAY

(75) Inventors: Masayuki Kuriyama, Ashiya (JP); Van Thuy Tran, Golden Valley, MN (US)

(73) Assignee: Veritec, Inc., Golden Valley, MN (US)

( * ) Notice: Subject to any disclaimer, the term of this patent is extended or adjusted under 35 U.S.C. 154(b) by 0 days.

(21) Appl. No.: 11/027,071

(22) Filed: Dec. 31, 2004

(65) Prior Publication Data

US 2006/0144946 A1    Jul. 6, 2006

(51) Int. Cl.
| | |
|---|---|
| G06Q 40/00 | (2006.01) |
| G06Q 30/00 | (2006.01) |
| G07D 11/00 | (2006.01) |
| G07F 19/00 | (2006.01) |
| G06K 5/00 | (2006.01) |
| G06K 7/10 | (2006.01) |
| G06K 7/00 | (2006.01) |
| G06K 19/00 | (2006.01) |
| H04M 1/66 | (2006.01) |
| H04M 1/68 | (2006.01) |
| H04M 3/16 | (2006.01) |
| G06F 21/00 | (2006.01) |

(52) U.S. Cl. .................. 235/379; 235/380; 235/462.01; 235/435; 235/487; 455/410; 455/411; 705/26; 705/35; 705/50

(58) Field of Classification Search .................. 455/410, 455/411; 705/26, 35, 50; 235/379, 380, 235/462.01, 435, 487
See application file for complete search history.

(56) References Cited

U.S. PATENT DOCUMENTS

| | | | | |
|---|---|---|---|---|
| 5,747,785 A | * | 5/1998 | Miller et al. | 235/472.01 |
| 6,307,541 B1 | | 10/2001 | Ho et al. | |
| 6,822,585 B1 | | 11/2004 | Ni et al. | |
| 6,925,439 B1 | * | 8/2005 | Pitroda | 705/1.1 |
| 6,991,155 B2 | * | 1/2006 | Burchette, Jr. | 235/379 |
| 7,043,635 B1 | * | 5/2006 | Keech | 713/168 |
| 7,328,844 B2 | * | 2/2008 | Workens | 235/451 |
| 7,363,252 B2 | * | 4/2008 | Fujimoto | 705/26 |

(Continued)

FOREIGN PATENT DOCUMENTS

JP        2001148037 A  *  5/2001

(Continued)

OTHER PUBLICATIONS

Motorola, Nextel and Creditel Team Up to Launch New Point-of-Sale Solution for Businesses, announcement dated Jun. 10, 2003, published at http://www.motorola.com/mediacenter/news/detail/0,1958,2912_2375_23,00.html.

(Continued)

Primary Examiner — Daniel Walsh
(74) Attorney, Agent, or Firm — Kagan Binder, PLLC

(57) ABSTRACT

A system and method for utilizing a highly secure two-dimensional matrix code on a mobile communications display includes a mobile communications device having a visible display, and a means for creating a highly secure two-dimensional matrix code representing selected data. Means are provided for selectively transmitting the highly secure two-dimensional matrix code, from the means for creating it to the mobile communications device. The highly secure two-dimensional matrix code is then displayed on the visible display of the mobile communications device. Upon reading the code, a transaction is facilitated.

1 Claim, 7 Drawing Sheets

U.S. PATENT DOCUMENTS

| | | | |
|---|---|---|---|
| 2002/0022967 A1* | 2/2002 | Ohkado | 705/1 |
| 2002/0023027 A1* | 2/2002 | Simonds | 705/26 |
| 2002/0040346 A1* | 4/2002 | Kwan | 705/51 |
| 2002/0060246 A1* | 5/2002 | Gobburu et al. | 235/462.46 |
| 2002/0062257 A1* | 5/2002 | Minamishin et al. | 705/26 |
| 2002/0065728 A1* | 5/2002 | Ogasawara | 705/23 |
| 2002/0073025 A1* | 6/2002 | Tanner et al. | 705/39 |
| 2002/0180585 A1* | 12/2002 | Kim et al. | 340/5.53 |
| 2003/0021398 A1 | 1/2003 | Donnelly et al. | |
| 2003/0022655 A1* | 1/2003 | Bogat | 455/406 |
| 2003/0050731 A1* | 3/2003 | Rosenblum | 700/232 |
| 2003/0050854 A1* | 3/2003 | Showghi et al. | 705/26 |
| 2003/0066883 A1* | 4/2003 | Yu | 235/382 |
| 2003/0163383 A1* | 8/2003 | Engelhart | 705/26 |
| 2004/0012569 A1* | 1/2004 | Hara | 345/169 |
| 2004/0039635 A1* | 2/2004 | Linde et al. | 705/14 |
| 2004/0084524 A1* | 5/2004 | Ramachandran | 235/380 |
| 2004/0122768 A1* | 6/2004 | Creamer et al. | 705/41 |
| 2004/0148253 A1* | 7/2004 | Shin et al. | 705/39 |
| 2004/0172359 A1* | 9/2004 | Nakamura | 705/39 |
| 2004/0198400 A1 | 10/2004 | Lin | |
| 2004/0249758 A1* | 12/2004 | Sukeda et al. | 705/57 |
| 2004/0267663 A1* | 12/2004 | Karns et al. | 705/40 |
| 2005/0059339 A1* | 3/2005 | Honda et al. | 455/3.01 |
| 2005/0086118 A1* | 4/2005 | Murooka | 705/26 |
| 2005/0125301 A1* | 6/2005 | Muni | 705/23 |
| 2006/0015825 A1* | 1/2006 | Mizuno et al. | 715/864 |
| 2006/0113382 A1* | 6/2006 | Singgih et al. | 235/383 |
| 2006/0131386 A1* | 6/2006 | Takano | 235/379 |
| 2006/0144946 A1* | 7/2006 | Kuriyama et al. | 235/462.1 |
| 2006/0278698 A1* | 12/2006 | Lovett | 235/380 |
| 2007/0021969 A1* | 1/2007 | Homeier-Beals | 705/1 |
| 2007/0130085 A1* | 6/2007 | Zhu | 705/75 |
| 2007/0138289 A1* | 6/2007 | Melick et al. | 235/462.41 |
| 2008/0035734 A1* | 2/2008 | Challa et al. | 235/462.46 |
| 2008/0059341 A1* | 3/2008 | Narayanaswami et al. | 705/28 |
| 2008/0195536 A1* | 8/2008 | Karns et al. | 705/39 |
| 2008/0210754 A1* | 9/2008 | Lovett | 235/380 |
| 2008/0314971 A1* | 12/2008 | Faith et al. | 235/379 |
| 2008/0314994 A1* | 12/2008 | Faith et al. | 235/493 |
| 2009/0039150 A1* | 2/2009 | Lay | 235/379 |
| 2009/0182634 A1* | 7/2009 | Park et al. | 705/14 |
| 2009/0254479 A1* | 10/2009 | Pharris | 705/42 |
| 2010/0125509 A1* | 5/2010 | Kranzley et al. | 705/17 |
| 2010/0133334 A1* | 6/2010 | Vadhri | 235/379 |

FOREIGN PATENT DOCUMENTS

| | | | |
|---|---|---|---|
| JP | 2004227607 | * | 4/2006 |
| JP | 2002109420 | * | 12/2006 |
| WO | WO 03/017153 A1 | * | 2/2003 |

OTHER PUBLICATIONS

Disclosure of a "MEDIASTAFF HR" reader of two-dimensional codes displayed on mobile telephones, dated Jun. 23, 2004 and published at http://nikkeibp.jp.wcs/leaf/CID/onair/jp/jp_print/315369.

* cited by examiner

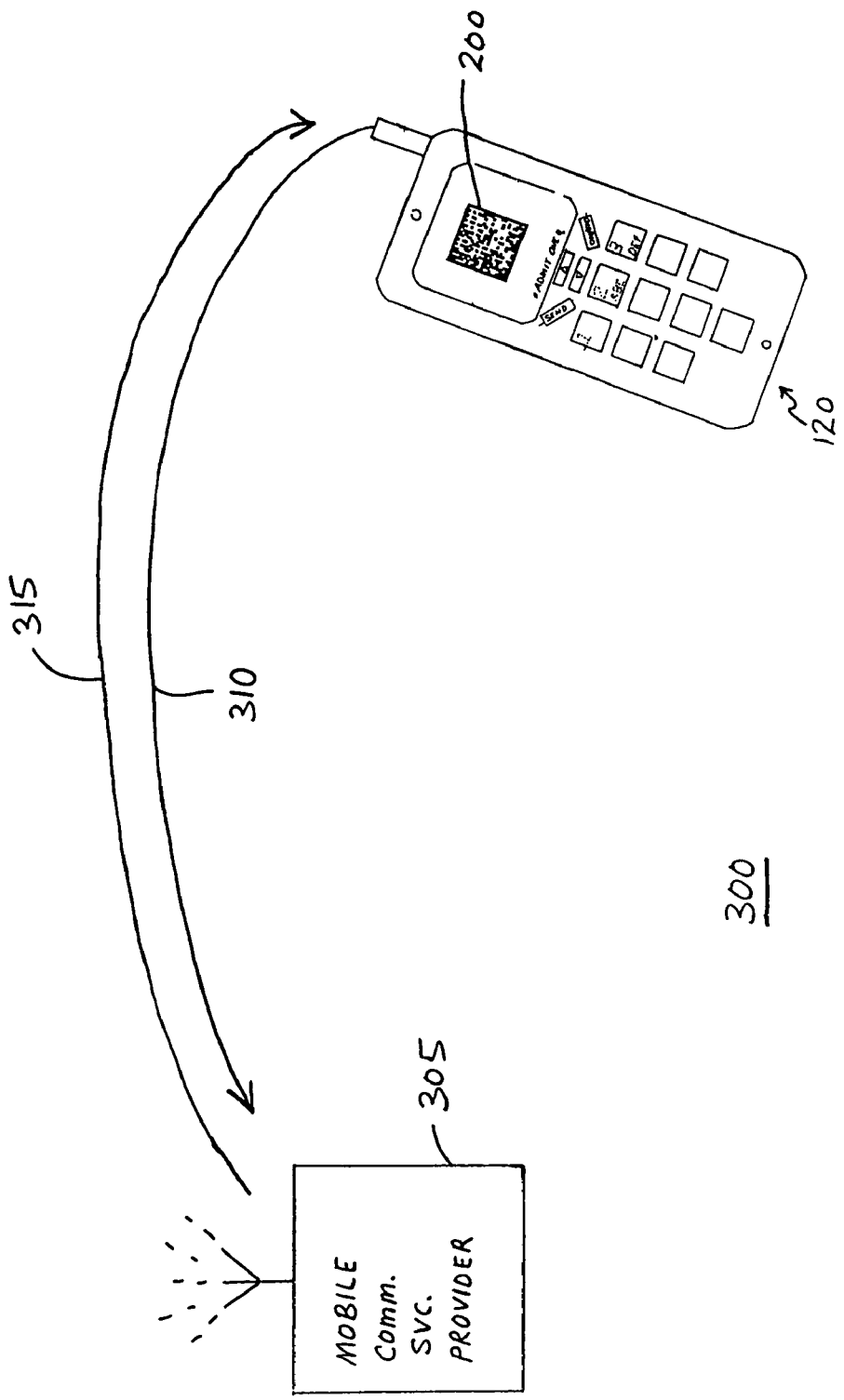

SYSTEM AND METHOD FOR UTILIZING A HIGHLY SECURE TWO-DIMENSIONAL MATRIX CODE ON A MOBILE COMMUNICATIONS DISPLAY

FIELD OF THE INVENTION

The present invention relates generally to mobile communications displays. The invention relates specifically to a system and method for utilizing a highly secure two-dimensional matrix code on a mobile communications display.

BACKGROUND OF THE INVENTION

Security and convenience in facilitating transactions have become concerns of paramount importance. The use of credit cards by consumers, for example, has been rapidly growing, and those utilizing credit cards have become concerned about security of their confidential data and information contained by the cards. Indeed, instances of so-called "identity theft" have increased along with the increased use of credit cards. Furthermore, numerous credit accounts necessitate the carrying in one's wallet or purse correspondingly numerous conventional plastic, magnetic stripe credit cards, which become bulky and cumbersome as they are accumulated.

In response to these concerns of security and convenience, various systems and methods have been proposed for use with conventional credit cards. Among these has been a "point-of-sale solution for businesses" developed jointly by the telecommunication firms Motorola, Nextel, and Creditel. This particular "solution" is said to utilize a "packet data network", allegedly making it "fast, easy and affordable for mobile businesses including retailers, taxi drivers and delivery personnel to securely process credit cards directly from the Java™ technology-enabled Motorola . . . handsets for Nextel." Specifically, the solution utilizes a magnetic stripe reader device that connects to a mobile telephone, together thus comprising a mobile point-of-sale device; when combined with certain encryption and application software, credit card transactions utilizing the solution are said to be fast, efficient, and reduce a likelihood of fraud. However, this solution does not address the basic problem of the carrying and use of myriad, conventional magnetic stripe credit cards by consumers.

In Japan, as an alternative to traditional simple transactions involving hard currency, such as coins, bills, tokens, tickets, and the like, and their attendant inefficiencies and relative lack of security, the telecommunications firm NTT DoCoMo, Inc. has developed a system and method for displaying a two-dimensional code on a mobile telephone. The code, as displayed on a user's mobile telephone, may represent data or information to facilitate a transaction. For example, when a user buys a concert ticket via a website, the user inputs all required personal information to the website. Upon verification of payment for the ticket (usually via an on-line credit account transaction) the user then receives a two-dimensional code on the display of the user's mobile telephone that contains all necessary information for admittance to the performance. The user then displays the on-screen "virtual ticket" to the concert's box office, to gain admission to the performance. As an example of an analogous system and method, a user may pay a utility bill utilizing a two-dimensional code via the user's mobile telephone. In such case, a utility company sends the bill as a two-dimensional code to the user's mobile telephone. The user then can pay the bill at a convenience store by connecting the mobile telephone to a specified point-of-sale register in the store. Also, the Coca-Cola Company may be conducting research and development for use of such a system and method in vending machine transactions. In that system and method, a user would display an on-screen "virtual token" or coupon to a vending machine, representing payment for a vending transaction, whereupon a product selected by the user would then be dispensed by the vending machine in response to its reading and accepting the virtual token. As used throughout this application, the phrase "two-dimensional code" is intended to include a "QR Code" of Denso Wave Incorporated and other conventional data codes; the phrase is intended to further include, alone or in any combination with each other or with the conventional data codes, standard alphanumeric characters of any language.

However the aforedescribed systems and methods have not been satisfactory because, for example, the two-dimensional codes used therein do not inherently provide adequate security. A thief could steal the user's mobile telephone and utilize the displayed symbol to fraudulently complete a transaction; and further, a relatively simple two-dimensional code such as a simple alphanumeric string could be readily copied for unauthorized use. Also, the two-dimensional codes currently utilized are relatively limited in their capacities to hold data.

Therefore, there exists a need for a highly secure two-dimensional matrix code on a mobile communications display which provides increased security and convenience, and which overcomes the drawbacks of the known systems and methods.

SUMMARY OF THE INVENTION

An object of the present invention is to provide a highly secure two-dimensional matrix code on a mobile communications display which provides increased security in transactions therewith.

Another object of the present invention is to provide a highly secure two-dimensional matrix code on a mobile communications display which may be conveniently used in transactions.

In accordance with the present invention, a system and method for utilizing a highly secure two-dimensional matrix code on a mobile communications display includes a mobile communications device having a visible display, and a means for creating a highly secure two-dimensional matrix code representing selected data. Means are provided for selectively transmitting the highly secure two-dimensional matrix code, from the means for creating it to the mobile communications device. The highly secure two-dimensional matrix code is then displayed on the visible display of the mobile communications device. Upon reading the code, a transaction is facilitated.

BRIEF DESCRIPTION OF THE DRAWINGS

FIG. 3 is an illustration of certain components of the system and method of the present invention.

FIG. 4b is an illustration of an alternative embodiment of the component of FIG. 4a.

FIG. 4c is an illustration of another alternative embodiment of the component of FIG. 4a.

FIG. 4d is an illustration of yet another alternative embodiment of the component of FIG. 4a.

FIG. 5b is an illustration of a device that may be utilized in place of the device depicted in FIG. 5a.

DETAILED DESCRIPTION OF THE INVENTION

Figure 1:
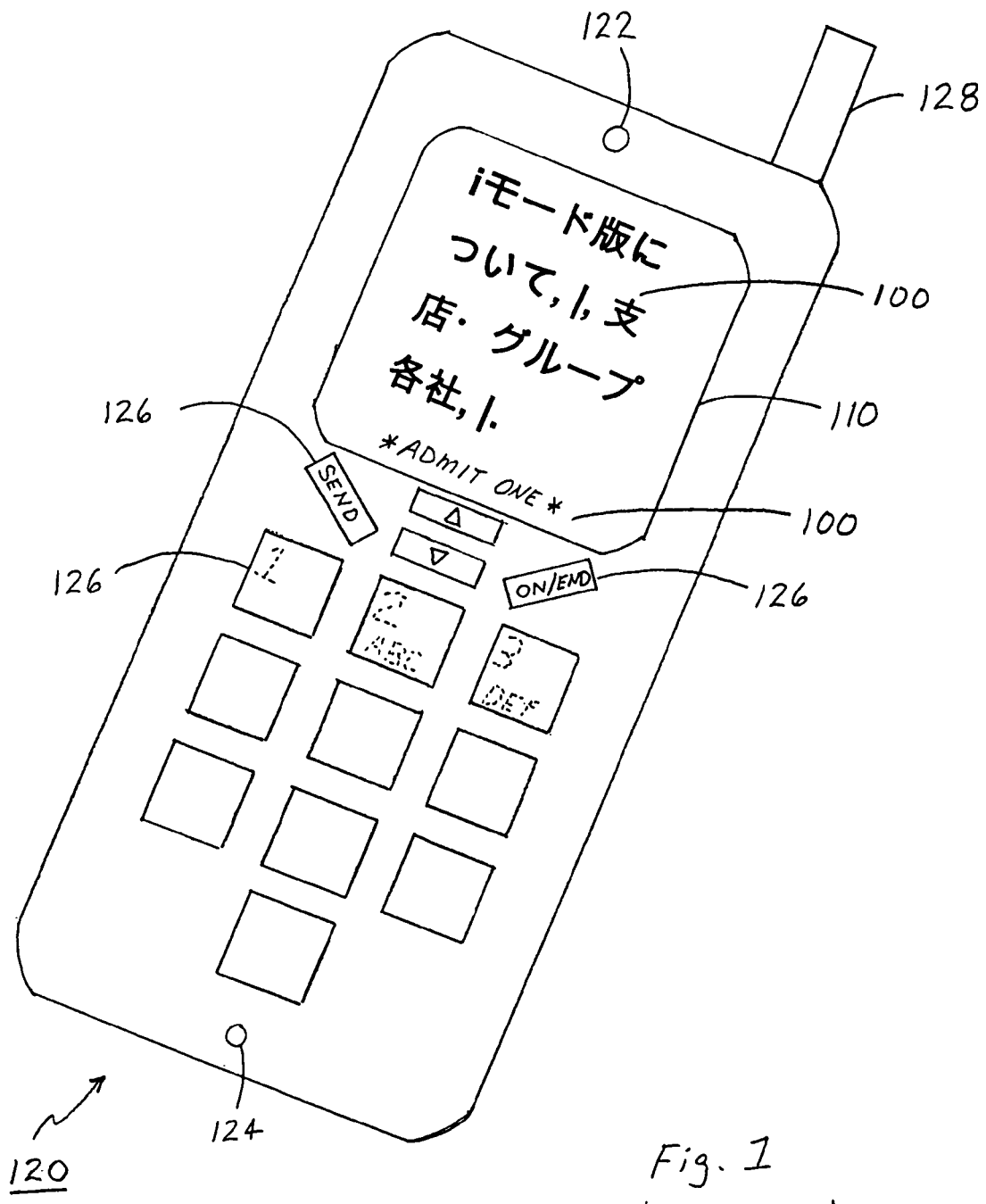
FIG. 1 is an illustration of a two-dimensional code being displayed on a mobile communications display, of the prior art.

Referring to FIG. 1, there shown is a two-dimensional code 100, including, by way of example, both Japanese and English language characters, being displayed on a mobile communications visible display 110 of a mobile communications device 120 of the prior art. In this exemplary prior art embodiment, such a visible display 110 is provided with a typical mobile telephone being the mobile communications device, as is well known. Device 120 usually includes a speaker 122, a microphone 124, a plurality of data entry or function buttons 126, and an antenna 128, as is well known. In use of such a prior art device, code 100 appears upon a user's command to device 120. Of course, code 100 could be any desired combination of graphics and language characters of any origin. In this regard, a means for selectively transmitting a two-dimensional code, from a means for creating the code, to the mobile communications device is described as follows. The command may be given via selecting an "on" condition on device 120 by way of ON/END button 126, and entering an access code for transmission by device 120 to a service provider in any well-known manner (not illustrated). In response to this signal, a reply message may then be transmitted by the service provider to device 120, shown on visible display 110 as two-dimensional code 100 created by the service provider in response to the request from the user resulting from the user's aforementioned command to device 120. Code 100 may then be displayed by the user to a recipient by way of, for example, simple visual inspection or an optical character recognition or "OCR" reader, as will be described relative to FIG. 4, to facilitate a given transaction as aforedescribed between the user and the recipient, e.g., a theatre box office. Specifically, code 100 represents selected data, e.g., an admission ticket, of the user to be accepted by the recipient.

Figure 2:
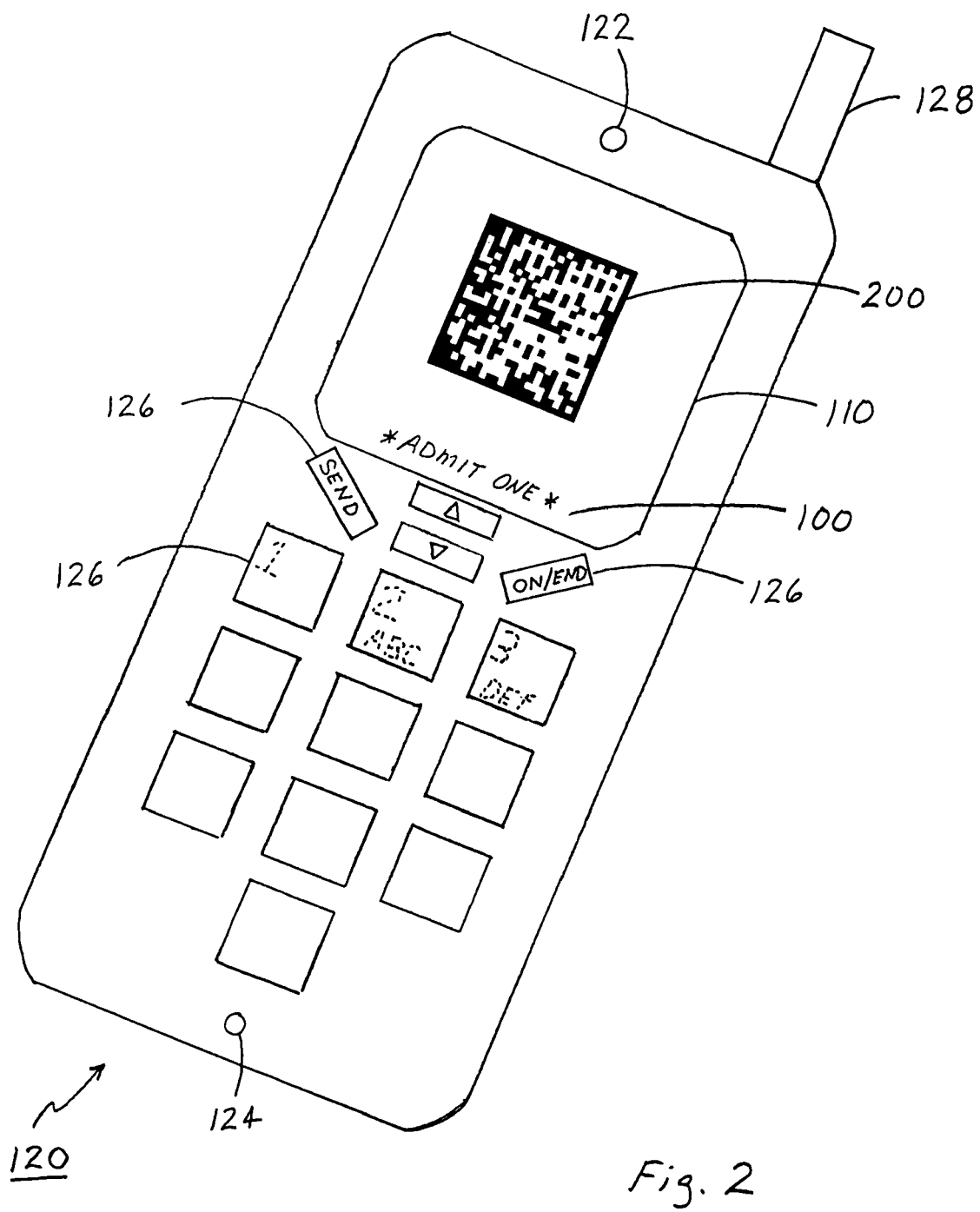
FIG. 2 is an illustration of a highly secure two-dimensional matrix code being displayed on a mobile communications display, of the system and method of the present invention.

Turning, now, to FIG. 2, there shown is an exemplary embodiment of a highly secure two-dimensional matrix code 200 being displayed on a mobile communications display 100 of a mobile communications device 120 (again, in an exemplary mobile telephone embodiment) of the system and method of the present invention. As used here throughout, the term "highly secure two-dimensional matrix code" is intended to include "VeriCode"® symbols and "VSCode"™ symbols, which are each commercially available from Veritec, Inc. of Golden Valley, Minn., the assignee of the present application. Also as used here throughout, the term "mobile communications device" is intended to include all communication devices which include a visible display. Such devices may be, for example, cellular telephones, pagers, personal computers, integrated wireless communications devices such as, for example, "BlackBerry"® devices which are commercially available from Research In Motion Limited of Waterloo, ON, Canada, personal digital assistants or "PDAs", and even wrist watches. Further, the term "visible display" is intended to include all suitable LCD displays, CRT displays, plasma displays, and the like, or any other suitable display for displaying data, symbols, information, graphics, or any other perceptible rendering. It is to be particularly appreciated and understood by those skilled in the coding arts that this novel utilization of a highly secure two-dimensional matrix code as defined herein greatly enhances security and "readability" of data represented thereby.

FIG. 3 illustrates in more detail the aforedescribed steps of selectively transmitting the code, from the means for creating the code, to the mobile communications device. In the illustration, a means 300 for creating code 200 is represented by, for example, a mobile communications service provider 305. In this example, a user initially selects an "on" condition on device 120 as aforedescribed and enters a discrete access code or command therein (not illustrated). The user then transmits 310 the access code from device 120 to service provider 305 of means 300 again as described. Provider 305 then receives the discrete command from device 120, whereupon a reply signal 315 is generated and transmitted back to device 120, which is then shown on visible display 110 as code 200, to facilitate a transaction between the user and a recipient as aforedescribed.

Although not illustrated in the figures, it is to be understood that device 120 could include a fingerprint reader or other fingerprint authentication means, for enabling only authorized operation of device 120 and thus greatly diminishing any chance of an unauthorized or fraudulent transaction.

Figure 4A:
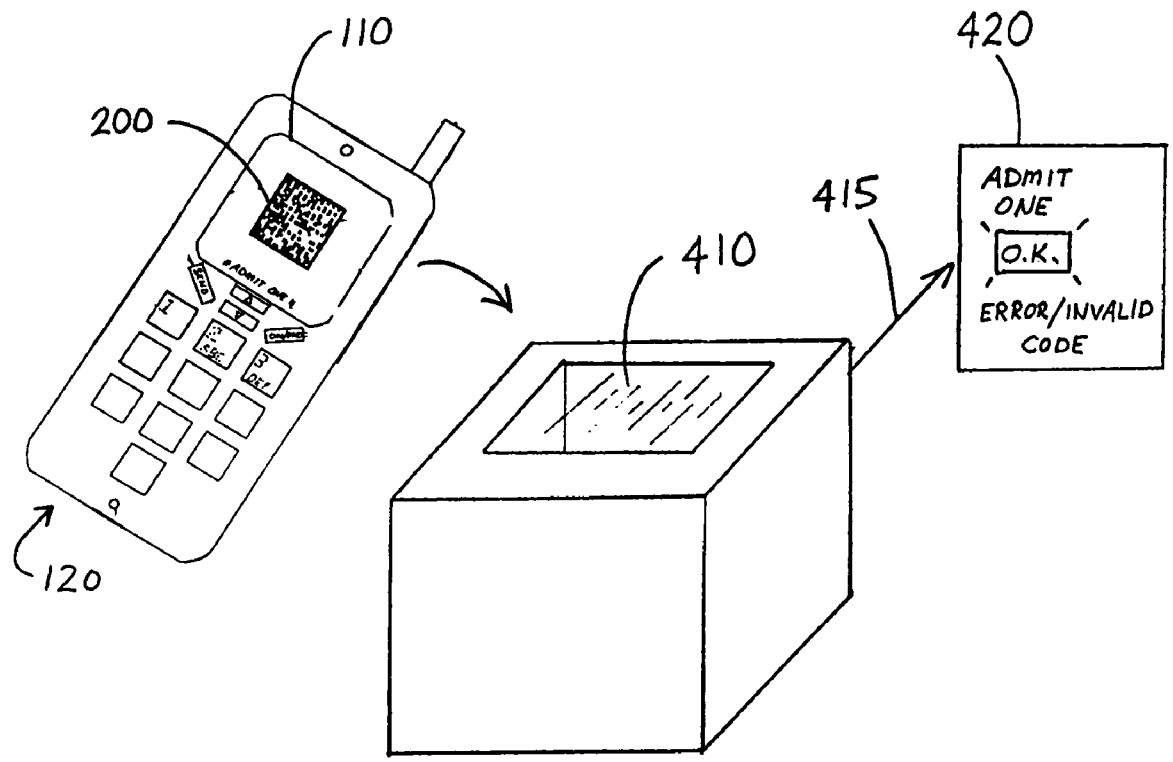
FIG. 4a is an illustration of another component of the system and method of the present invention.

FIG. 4a illustrates an exemplary embodiment of a reader 400, for a highly secure two-dimensional matrix code, of the present invention. Exemplary reader 400 is commercially available from the aforementioned Veritec, Inc. Reader 400 employs an input screen or window 410, whereupon device 120 is placed or held nearby such that visible display 110 is in communication therewith. Specifically, code 200 visibly displayed on display 110 of device 120 is read by reader 400 through its window 410. In turn, an output signal 415 may be generated that is indicative of code 200, with resulting data being input to a recipient's device 420 to facilitate a given transaction; e.g., authentication and acceptance of a theatre admission ticket (as depicted by illumination of the "O.K." alternative in the illustration).

Figure 4B:
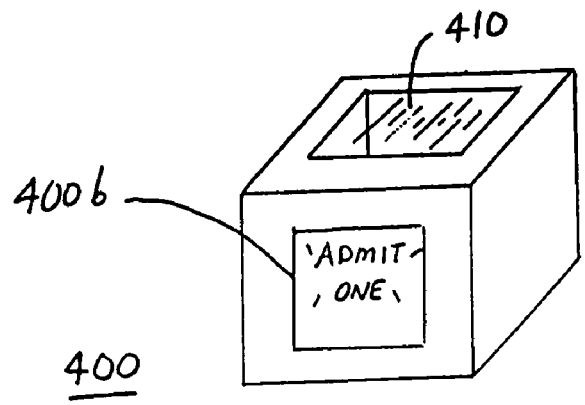
Figure 4C:
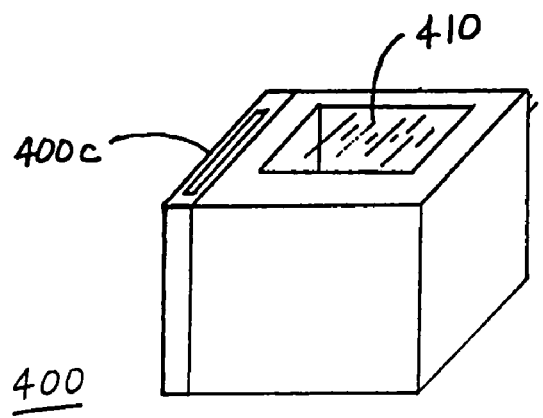
Figure 4D:
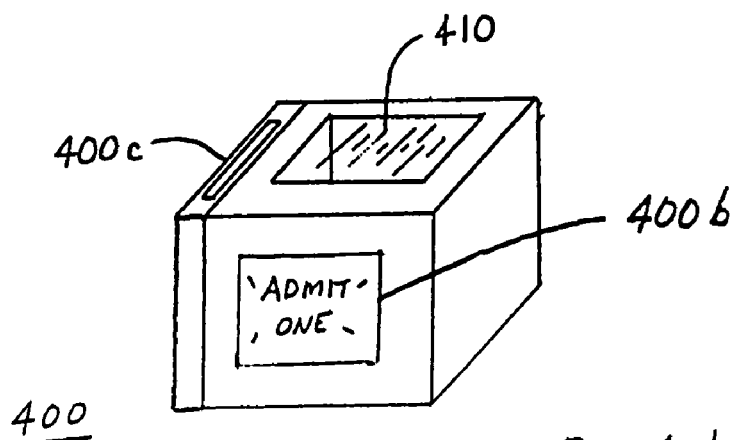

FIGS. 4b, 4c, and 4d illustrate alternative exemplary embodiments of reader 400 shown in FIG. 4a. In FIG. 4b, a display screen 400b is incorporated into reader 400 itself, thereby eliminating a need for a separate recipient's device 420. Screen 400b may display, for example, an intelligible "plain language" or decoded version of code 200. In FIG. 4c, a conventional magnetic stripe card reader 400c is incorporated into reader 400 itself, advantageously making reader 400 a dual-purpose conventional magnetic card reader and highly secure two-dimensional matrix code reader. It is to be understood that card reader 400c is also intended to accommodate a proprietary card technology being developed by the aforementioned Veritec, Inc., for holding information for multiple financial accounts on one card. In FIG. 4d, reader 400 includes both screen 400b and card reader 400c. Although not specifically illustrated, reader 400 could also provide an interactive feature by way of, for example, so-called "touch screen" functionality in screen 400b as is well known. Such an interactive display would be of great benefit when, for example, code 200 represents a plurality of accounts of a user and the user would then select the desired account for the transaction via the touch screen display.

Figure 5A:
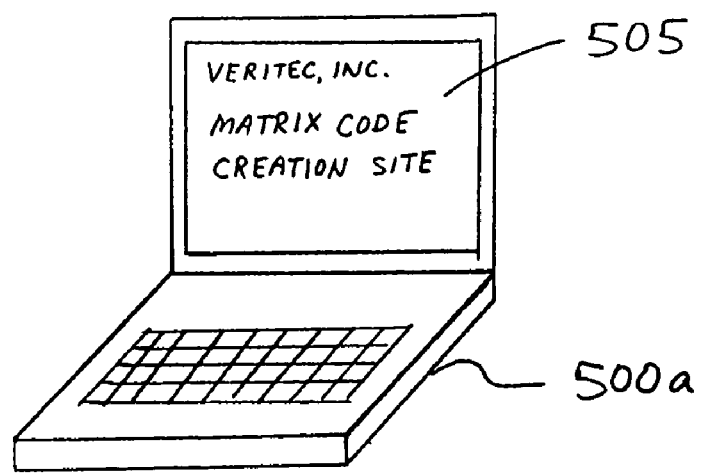
FIG. 5a is an illustration of a device that may be utilized in the system and method of the present invention.
Figure 5B:
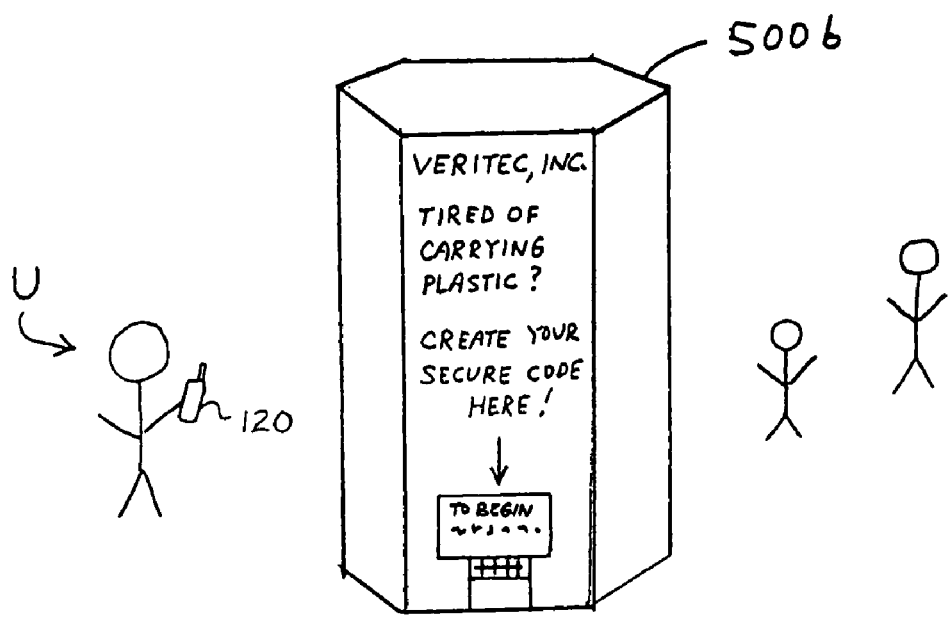

FIGS. 5a and 5b illustrate alternative exemplary embodiments of means for creating a highly secure two-dimensional matrix code representing selected data in the system of the present invention. In each example, an interactive program (not specifically illustrated) is accessible by a user of the system and is responsive to data input therein by the user. In FIG. 5a, the interactive program is accessible to the user through an internet web site (represented generally by screen 505) via the user's personal computer 500a. In FIG. 5b, the interactive program is accessible to the user through a stand-alone kiosk 500b. Such a kiosk could be located in a retail environment, as are commonly seen in shopping malls and the like. In this exemplary embodiment, a user U would approach kiosk 500b and, for a fee payable to the operator of the kiosk, enter all credit card numbers and expiration dates as prompted. Then, a unique, discrete code 200 would be generated that is indicative of such inputs by the user. Code 200 could then be downloaded, by any suitable means, to the user's mobile communications device 120.

Figure 6:
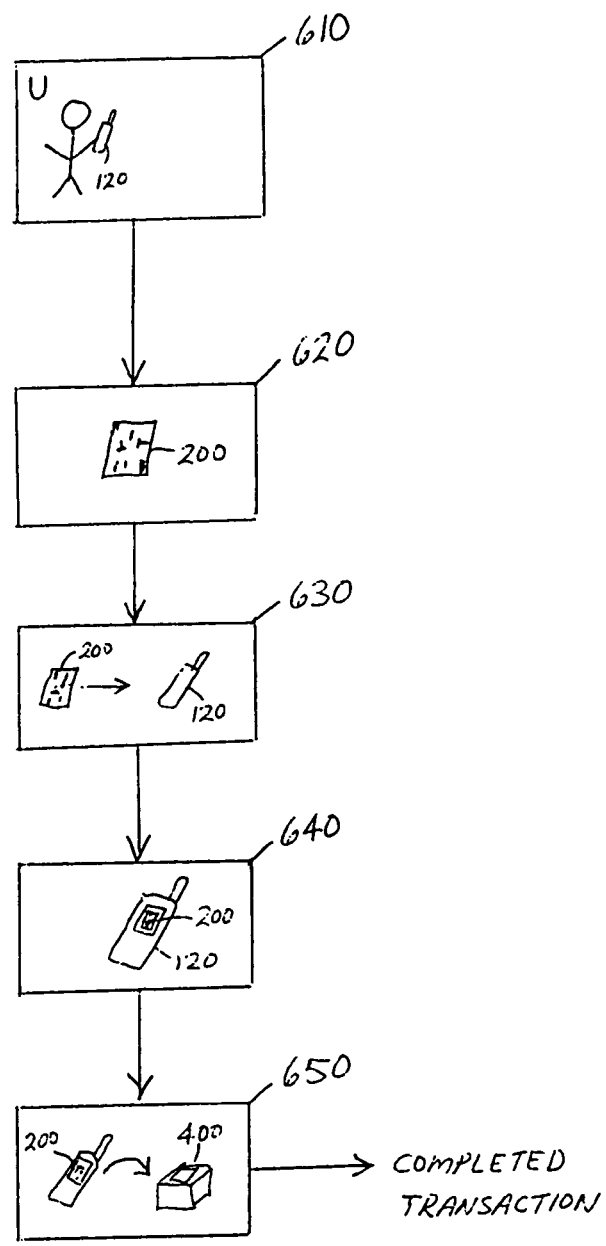
FIG. 6 is a flow chart of the method of the present invention.

Turning, now, to FIG. 6, a flow chart depicts a method 600 of the present invention, for utilizing a highly secure two-dimensional matrix code on a mobile communications display to facilitate a selected transaction between a user and a recipient. Therein, method 600 begins at 610 with a user U providing a mobile communications device 120 having a visible display. A means 620, which may be means 300 of FIG. 3, is then provided for creating a highly secure two-dimensional matrix code 200 representing selected data. Next, a means 630, which may be generally characterized in FIG. 3 by the user's transmission of an access code (at 310) and the reply signal of the service provider (at 315), is provided for selectively transmitting code 200 from means 620 to the user's mobile communications device 120. At 640, which may also be generally characterized as within a capability of means 300, code 200 is then displayed on visible display 110 of device 120. A means 650, which may be means 400 of FIGS. 4a-d, is then provided for reading code 200, such that a selected transaction is facilitated between the user and the recipient as aforedescribed.

As mentioned above, a fingerprint authentication means could be employed in method 600 with the user's mobile communications device for enabling only authorized operation of the device. Further, although not depicted in FIG. 6, method 600 could include a step of providing a means for generating code 200 by way of an interactive program that is accessible to the user and is responsive to data input therein by the user. In this regard, the further method step could employ an internet web site (e.g., FIG. 5a) or a stand-alone kiosk (e.g., FIG. 5b).

Additionally, the aforementioned means 650 of method 600 could include the use of a display device for displaying selected data which is, at least in part, characteristic of code 200 and in a plain language, intelligible form (e.g., FIG. 4b). The display device could be, at least in part, interactive and could include a card reader (FIG. 4c).

From the foregoing description of exemplary embodiments of the system and method of the present invention, it is to be appreciated that a "virtual purse" is provided in a highly secure and efficient manner, through a highly secure two-dimensional matrix code displayed on a user's mobile communications device. The virtual purse advantageously replaces myriad hard currency as aforedescribed, and also replaces conventional magnetic stripe information cards, credit cards, and debit cards as was heretofore unknown.

It is also to be appreciated that the system and method of the present invention utilizing a highly secure two-dimensional matrix code provides increased security over known two-dimensional codes as aforedescribed, and has an ability to hold much more data than a conventional two-dimensional code.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired results, or that various accessories may be added thereto.

It is also to be understood that the highly secure two-dimensional matrix code component of the present invention could be (i) generated by the service provider upon each occurrence of a request for service by the users or (ii) stored as a "static" code within a memory feature of the mobile communications device and called up on demand by the user similar to retrieving a stored telephone number from memory. Additionally, the present invention may also comprise a system and method whereby a user could specify on the mobile communications device (through usual device inputs such as its keypad) which particular account of the user is to be utilized for a particular transaction, whereupon a corresponding discrete highly secure two-dimensional matrix code would be displayed on the screen of the device. Further, the code could be "time stamped" for even greater security; expiration of a specified time from the time stamp of the code would render the code obsolete and useless.

Lastly, the choice, of course, of compositions, sizes, and strengths of various aforementioned components of the present invention are all a matter of design choice depending upon intended uses thereof. Accordingly, these and other various changes or modifications in form and detail of the present invention may also be made therein, again without departing from the true spirit and scope of the invention as defined by the appended claims.

What is claimed is:

1. A method for providing and permitting use of a secure two-dimensional matrix code on a mobile communications display for the purpose of facilitating a selected transaction between a user and a recipient, said method comprising steps of:

electromagnetically receiving a request from a user as part of a transaction between the user and a recipient;

generating a secure two-dimensional matrix code comprising data including at least a verification of the transaction and further selected data directed to at least account numbers of the user related to a financial aspect of the transaction, and goods and services information related to the transaction, said code including such data in order to facilitate the transaction as such data is coded within the two-dimensional matrix and as authorized by the recipient;

transmitting image data of the secure two-dimensional matrix code to a mobile communications device so that the secure two-dimensional matrix code can be created on a display of the mobile communications device;

reading the two-dimensional matrix code off the display of the mobile communications device by a remote reader, wherein the reader includes a touch screen for display, and displaying at least portions of the financial account numbers of the user as determined from the two-dimensional barcode on the touch screen, and receiving an election by the user of a chosen financial account of the user for completing the transaction;

upon electromagnetically reading of the two-dimensional matrix code, receiving a signal from the remote reader including transactional use data regarding the transaction and the further selected data between the user and recipient, and as a result of such transactional use data and the further selected data, checking the validity for use of the secure two-dimensional matrix code as a part of the transaction between the user and the recipient; and electromagnetically transmitting data regarding acceptability of the use of the secure two-dimensional matrix code to at least one of the recipient, the user and the reader, wherein acceptability of the use of the secure two-dimensional matrix code results permits completion of the transaction between the user and the recipient.

* * * * *